(12) United States Patent
Stähr et al.

(10) Patent No.: US 6,689,248 B1
(45) Date of Patent: Feb. 10, 2004

(54) PROCESS FOR PRODUCING AN ELASTOMER SUBSTRATE WEB

(76) Inventors: Jochen Stähr, Treptoweg 8, D-30179 Hannover (DE); Axel Burmeister, Am Kattenberg 65, D-21244 Buchholz (DE); Hermann Neuhaus-Steinmetz, Amselweg 9a, D-22926 Ahrensburg (DE); Uwe Schümann, Hollandweg 26a, D-25421 Pinneberg (DE)

( * ) Notice: Subject to any disclaimer, the term of this patent is extended or adjusted under 35 U.S.C. 154(b) by 0 days.

(21) Appl. No.: 09/479,820

(22) Filed: Jan. 7, 2000

(30) Foreign Application Priority Data

Jan. 7, 1999 (DE) .......................... 199 00 183

(51) Int. Cl.$^7$ .............................................. B29C 67/00
(52) U.S. Cl. .................... 156/324; 156/242; 156/306.3; 156/582; 264/173.1; 264/175; 525/235; 525/236; 525/241; 525/222; 525/227; 525/130
(58) Field of Search ................................ 156/242, 243, 156/244, 11, 27, 246, 306.3, 500, 501, 555, 157, 324, 582; 264/45.8, 45.9, 46.1, 46.2, 46.3, 172.19, 173.1, 175, 216; 525/236, 241, 235, 227, 222, 130; 428/42.3

(56) References Cited

U.S. PATENT DOCUMENTS

| | | | |
|---|---|---|---|
| 2,771,388 A | * 11/1956 | Rocky et al. | 156/231 |
| 3,264,155 A | * 8/1966 | Rhee | 156/160 |
| 4,304,885 A | * 12/1981 | Omori et al. | 525/236 |
| 4,306,927 A | 12/1981 | Funk et al. | |
| 4,526,640 A | * 7/1985 | Deregibus | 156/242 |
| 4,617,227 A | * 10/1986 | Weaver | 428/220 |
| 5,281,373 A | 1/1994 | Tamura et al. | |
| 5,397,611 A | 3/1995 | Wong | |
| 5,783,272 A | 7/1998 | Wong | |
| 6,520,235 B1 | * 2/2003 | Pasti | 156/501 |

FOREIGN PATENT DOCUMENTS

| | | |
|---|---|---|
| EP | 0335152 A2 | 10/1989 |
| EP | 0335152 A3 | 10/1989 |
| EP | 0799686 A1 | 10/1997 |
| JP | 63224913 | 9/1988 |
| JP | 63224914 | 9/1988 |
| JP | 05008242 | 1/1993 |
| JP | 11090949 | 4/1999 |

OTHER PUBLICATIONS

European Search Report for Appl. No. EP 00 10 0062.9–2307.

* cited by examiner

Primary Examiner—Michael W. Ball
Assistant Examiner—Jessica Rossi
(74) Attorney, Agent, or Firm—Norris, McLaughlin & Marcus

(57) ABSTRACT

Process for producing an elastomer substrate web, comprising the following process steps:

a) feeding in a polymer mixture, in particular into a mixer, b) conveying the ready-prepared polymer mixture to a calender, comprising at least two rollers, c) forming the polymer mixture out in the calender into a web, d) applying an auxiliary substrate in web form by means of a pressure-exerting roller, which is in contact with the last forming calender roller, for receiving the web, and e) if appropriate, cooling, crosslinking and/or winding up the web located on the auxiliary substrate.

9 Claims, 2 Drawing Sheets

PROCESS FOR PRODUCING AN ELASTOMER SUBSTRATE WEB

The invention concerns a process for producing an elastomer substrate web.

The process for producing an elastomer substrate web known from the prior art usually comprises a customary calendering process, in which a polymer mixture is passed from an internal mixer either via a breaking mill with a conveyor belt or a conveying extruder to a calender.

In the said calender, an endless, uniform polymer web is produced by using considerable energy (mechanical and thermal). This polymer web is drawn off the last forming roller by means of one or two driven shafts and is passed via chilling rollers and/or a chilling belt to the wind-up.

In the winding-up station, the polymer web is provided with a release agent, whether a powder or an intermediate substrate in web form with good release properties, such as a PE film for example. Finally, winding into a bale takes place.

FIG. 1 shows a graphic representation of the known process.

According to this known process, the polymer mixture 1, prepared in a mixer which is not represented in any more detail, is fed via the mill 10 to a calender 20, formed by four rollers, in which the polymer mixture 1 is formed out into a web 2. The web 2 is passed on via further rollers into the cooling station 30. Upstream of the winding station 40, the auxiliary substrate 3 is placed onto the web 1.

This process has proven successful for classic polymer mixtures.

However, the process described above fails in principle when forming out polymer mixtures with strong inherent tack and/or with low strength in the uncrosslinked state, to be precise because the polymer web cannot be drawn off the last forming roller without the web tearing, or only if it stretches severely.

For mixtures with strong inherent tack and/or with low strength in the uncrosslinked state, therefore only coating by means of a nozzle has been possible until now.

The object of the invention is to provide a process which makes it possible to process polymer mixtures with high inherent tack and/or low strength on conventional calenders without any loss in efficiency or product quality and without additional complex modifications.

This object is achieved by a process as set out in the main claim. Advantageous embodiments of the same are the subject of the subclaims.

Accordingly, the invention concerns a process for producing an elastomer substrate web, comprising the following process steps:

a) feeding in a polymer mixture, in particular into a mixer, b) conveying the ready-prepared polymer mixture to a calender, comprising at least two rollers, c) forming the polymer mixture out in the calender into a web, d) applying an auxiliary substrate in web form by means of a pressure-exerting roller, which is in contact with the last forming calender roller, for receiving the web, and e) if appropriate, cooling, crosslinking and/or winding up the web located on the auxiliary substrate.

The auxiliary substrate can completely absorb the drawing-off stresses occurring at the calender roller, so that the actual product is not subjected to any stressing. In a preferred embodiment, the auxiliary substrate comprises commercially available films, papers or woven fabrics, if appropriate with release properties specifically set to suit the product, so that it can be removed again without any problem during further processing.

In addition, the auxiliary substrate may be used for the building up of multi-layer systems, in that it is provided with one or more layers on conventional coating installations. These layers may be, for example, colour, barrier, primer and/or adhesive layers.

The process according to the invention also offers the possibility, by application of the auxiliary substrate on both sides, of providing the polymer web with one or more layers on both sides. If appropriate, for this purpose the auxiliary substrate must be provided with an additional release film, in order to avoid blocking of the layers. The auxiliary film should then be uncovered before applying to the polymer web.

The polymer mixture is preferably chosen from the group of natural rubbers or synthetic rubbers or it comprises a two-component blend of natural rubber/synthetic rubber or two synthetic rubbers.

Furthermore, the synthetic rubber or the synthetic rubbers is or are preferably chosen from the group of randomly copolymerized styrene-butadiene rubbers (SBR), butadiene rubbers (BR), synthetic polyisoprenes (IR), butyl rubbers (IIR), halogenated butyl rubbers (XIIR), polyacrylate rubbers (ACM), ethylene-vinyl acetate copolymers (EVA) and polyurethanes.

Furthermore, the polymer mixture may contain additives such as fillers, antioxidants, plasticizers and adhesive resins.

All adhesive resins previously known and described in the literature can be used as tackifying resins. Mentioned by way of example are colophony resins, their disproportionated, hydrated, polymerized, esterified derivatives and salts, aliphatic and aromatic hydrocarbon resins, terpene resins and terpene phenolic resins. Any desired combinations of these and further resins may be used in order to adjust the properties of the resultant adhesive compound according to desired requirements. Reference is made expressly to the description of the current state of knowledge in the "Handbook of Pressure Sensitive Adhesive Technology" by Donatas Satas (van Nostrand, 1989).

All plasticizing substances known from adhesive tape technology can be used as plasticizers. These include, inter alia, paraffinic and naphthenic oils, (functionalized) oligomers such as oligobutadienes, oligoisoprenes, liquid nitrile rubbers, liquid terpene resins, vegetable and animal oils and fats, phthalates, functionalized acrylates.

For the purpose of thermally induced chemical crosslinking, all the previously known thermally activatable chemical crosslinking agents, such as accelerated sulphur or sulphur-onor systems, isocyanate systems, reactive melamine, formaldehyde and (optionally halogenated) phenolic formaldehyde resins or reactive phenolic-resin or diisocyanate crosslinking systems with the corresponding activators, epoxidized polyester and acrylic resins as well as their combinations can be used in the case of the process according to the invention.

The crosslinking agents are preferably activated at temperatures in excess of 50° C., in particular at temperatures from 100° C. to 160° C., most particularly preferably at temperatures from 110° C. to 140° C.

The thermal activation of the crosslinking agents may also take place by means of IR rays or highenergy alternating fields. The crosslinking of the polymer mixture may, furthermore, take place by means of a combination of ionizing radiation and chemical crosslinking agents.

The thickness of the web downstream of the calender is, in particular, between 100 µm and 4000 µm, in particular 400–2500 µm. The auxiliary substrate has, in particular, a thickness of between 10 µm and 2000 µm, preferably between 15 µm and 150 µm.

The process can be used particularly advantageously for producing a web from a hot-melt adhesive compound on the basis of non-thermoplastic elastomers.

Surprisingly, it was found that, by the use of auxiliary substrates, a high bonding strength can be achieved in multi-layer systems without an additional processing step and an unusually good constancy of thickness can be achieved, unattainable by conventional forming out with the polymer mixtures described.

The process according to the invention is to be described in more detail below by means of a further figure and on the basis of several examples, without wishing to restrict the invention unnecessarily. In the drawing:

DETAILED DESCRIPTION OF THE DRAWINGS

EXAMPLE 1

Figure 1:
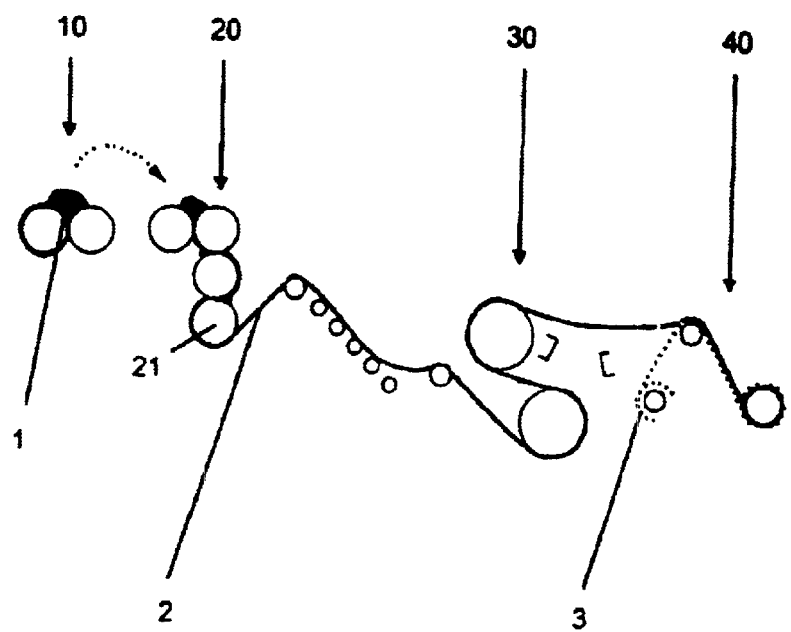
FIG. 1 shows a flow diagram of a prior art process for producing an elastomer substrate web.
Figure 2:
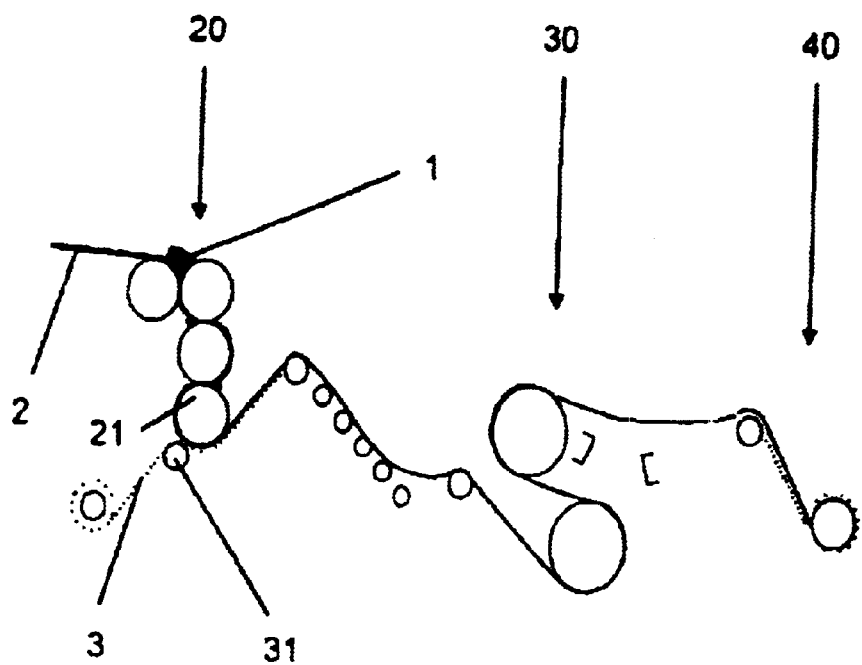
FIG. 2 shows the path of the polymer mixture from the calender to the winding station.

In a mixer, again not explained in any more detail, a polymer mixture is prepared according to the following formulation:

|  | Density [g/cm$^3$] | Proportion [phr] |
|---|---|---|
| CV 50 | 0.92 | 100.0 |
| Carbon black N 772 | 1.80 | 9.8 |
| Whiting | 2.70 | 26.4 |
| ASM | 1.00 | 2.0 |
| X6 | 1.00 |  |
| Total compound |  | 138.2 |

This ready prepared polymer mixture 1 is fed to a calender station 20 having four rollers. In the calender station 20, the polymer mixture 1 is formed out into a web 2. By means of a pressure-exerting roller 31 at the last forming calender roller 21, an auxiliary substrate 3 in web form, which serves for receiving the web 2, is applied.

The web 2 together with the auxiliary substrate is passed on via further rollers into the cooling station 30. After the cooling operation, the winding up of web 2 with auxiliary substrate 3 takes place in the winding station 40. The auxiliary substrate is in this case formed by a simple PE film.

EXAMPLE 2

The process for producing the polymer mixture corresponds to that from Example 1, and the process also has identical installation parts.

In this alternative embodiment, the auxiliary substrate of film is provided with a barrier coating, and a primer on the latter, in customary coating stations before applying to the web.

EXAMPLE 3

The process for producing the polymer mixture corresponds to that from Example 1, and the process also has identical installation parts.

In this further alternative embodiment, the auxiliary substrate of film is provided on both sides with a barrier coating, and a primer respectively on the latter, in customary coating stations before applying to the web.

EXAMPLE 4

The process for producing the polymer mixture corresponds to that from Example 1, and the process also has identical installation parts.

In this further alternative embodiment, the auxiliary substrate of release paper is provided on one side with a self-adhesive compound, which if appropriate may also be provided with a barrier layer and/or primer layer, before applying to the web.

What is claimed is:

1. Process for producing an elastomer substrate web, comprising the steps of:

a) feeding a polymer mixture into a mixer, and mixing;

b) conveying the mixed polymer mixture to a calender, comprising at least two rollers, c) calendering the polymer mixture to form it into a web which remains in contact with a last forming calender roller after completion of the calendering, d) bringing an auxiliary substrate into contact with the web remaining on the last forming calender roller after calendering, and pressing a pressure-exerting roller that is not a roller of the calender against the auxiliary substrate that is in contact with the web while said web remains in contact with said last forming calender roller, to apply pressure against the auxiliary substrate and web between said last forming calender roller and said pressure-exerting roller and apply said auxiliary substrate to said web, drawing said auxiliary substrate and web off of said last forming calender roller with said auxiliary substrate still applied to said web, and e) optionally cooling, crosslinking, or winding up the web with the auxiliary substrate applied thereto, or a combination thereof wherein the auxiliary substrate has release properties so that the auxiliary substrate can be removed from the web.

2. Process according to claim 1, wherein the auxiliary substrate comprises films, papers or woven fabrics.

3. Process according to claim 1, wherein the auxiliary substrate is provided with one or more auxiliary layers before application to the web.

4. Process according to claim 1, wherein the polymer mixture contains additives selected from the group consisting of fillers, antioxidants, plasticizers and adhesive resins.

5. Process according to claim 1, characterized in that a thickness of the web downstream of the calender is between 100 µm and 2500 µm.

6. Process according to claim 1, wherein the auxiliary substrate has a thickness of 10 µm to 2000 µm.

7. Process according to claim 1, wherein said polymer mixture is a hot-melt adhesive compound of non-thermoplastic elastomers.

8. Process according to claim 1, wherein the polymer mixture is selected from the group consisting of natural rubbers, synthetic rubbers, two-component blends of natural rubbers and synthetic rubbers; and two component blends of synthetic rubbers.

9. Process according to claim 8, wherein the synthetic rubber or rubbers is or are selected from the group consisting of randomly copolymerized styrene-butadiene rubbers, butadiene rubbers, synthetic polyisoprenes, butyl rubbers, halogenated butyl rubbers, polyacrylate rubbers, ethylene-vinyl acetate copolymers and polyurethanes.

* * * * *